United States Patent
Mesner et al.

(10) Patent No.: US 9,097,360 B2
(45) Date of Patent: Aug. 4, 2015

(54) PILOT OPERATED VALVE

(71) Applicant: Parker-Hannifin Corporation, Cleveland, OH (US)

(72) Inventors: Steve Mesner, Tomah, WI (US); Anis M. Rahman, Lake Villa, IL (US); Srinivasu N. V. S. Jalluri, Hyderabad (IN); Brian D. Marshall, Clemmons, NC (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 14/389,863

(22) PCT Filed: Apr. 3, 2013

(86) PCT No.: PCT/US2013/035181
§ 371 (c)(1),
(2) Date: Oct. 1, 2014

(87) PCT Pub. No.: WO2013/152139
PCT Pub. Date: Oct. 10, 2013

(65) Prior Publication Data
US 2015/0192216 A1     Jul. 9, 2015

Related U.S. Application Data

(60) Provisional application No. 61/619,550, filed on Apr. 3, 2012.

(51) Int. Cl.
    *F15B 13/06*     (2006.01)
    *F16K 31/05*     (2006.01)
    (Continued)

(52) U.S. Cl.
    CPC ............. *F16K 31/05* (2013.01); *F15B 13/0835* (2013.01); *F16K 27/02* (2013.01); *F16K 31/44* (2013.01)

(58) Field of Classification Search
    CPC ....... F16K 31/05; F16K 27/02; F16K 27/029; F16K 31/44; F15B 13/0835; F15B 13/08; F15B 2013/002; F15B 2013/004
    USPC .................................................. 137/269, 271
    See application file for complete search history.

(56) References Cited

U.S. PATENT DOCUMENTS

| | | |
|---|---|---|
| 3,754,730 A | 8/1973 | Nilles et al. |
| 5,050,635 A | 9/1991 | Tetsuka et al. |

(Continued)

FOREIGN PATENT DOCUMENTS

DE     25 12 441     9/1976

OTHER PUBLICATIONS

International Search Report and Written Opinion corresponding to International Application No. PCT/US2013/035181 mailed Oct. 24, 2013.

(Continued)

*Primary Examiner* — Kevin Lee
(74) *Attorney, Agent, or Firm* — Renner, Otto, Boisselle & Sklar, LLP

(57) ABSTRACT

A valve for a refrigeration system includes a valve body having an inlet port, an outlet port, and walls forming a main cavity. The valve also includes a cartridge that resides within the main cavity and having a piston configured to travel in a first direction to permit fluid flow from the inlet port to the outlet port and in a second direction to impede fluid flow from the inlet port to the outlet port and a port plate configured to removably couple to the valve body to substantially close an end of the main cavity substantially enclosing the cartridge within the main cavity, the port plate including a plurality of ports, each port configured to accept at least one of various valve control elements configured to control the piston to permit or impede the fluid flow from the inlet port to the outlet port.

18 Claims, 13 Drawing Sheets

(51) Int. Cl.
  *F16K 27/02* (2006.01)
  *F16K 31/44* (2006.01)
  *F15B 13/08* (2006.01)

(56) References Cited

U.S. PATENT DOCUMENTS

| | | | |
|---|---|---|---|
| 6,883,614 B2 * | 4/2005 | Schmidt et al. | 251/214 |
| 7,669,609 B2 * | 3/2010 | Hansen et al. | 137/269 |
| 8,733,735 B2 * | 5/2014 | Strebe | 251/291 |
| 2006/0197041 A1 | 9/2006 | Szymaszek | |
| 2012/0135833 A1 * | 5/2012 | Chen | 475/149 |

OTHER PUBLICATIONS

International Preliminary Report on Patentability corresponding to International Application No. PCT/US2013/035181 mailed Aug. 8, 2014.

* cited by examiner

PILOT OPERATED VALVE

PRIORITY APPLICATION

The present patent application claims the benefit of priority from U.S. Provisional Application No. 61/619,550 filed on Apr. 3, 2012.

TECHNICAL FIELD

The present invention relates to valves for controlling the flow of fluid in a system, in particular for controlling the flow of liquid and/or gaseous refrigerant in the industrial refrigeration industry or other industries where corrosive environments are common.

BACKGROUND

Control valves are used to control flow of, for example, refrigerants in refrigeration systems. One such valve, described in U.S. Pat. No. 7,669,609 assigned to Parker Hannifin Corporation, describes a universal refrigeration valve (URV) for controlling the flow of refrigerant in an industrial refrigeration system. The URV has a weld-in valve body made from stainless steel to prevent corrosion. For manual operation, the valve utilizes a redirection of pressure from the top of a valve actuating piston for opening the valve.

SUMMARY

This specification describes a weld-in-place control valve having particularly advantageous application in the industrial refrigeration industry for controlling flow of refrigerant or other fluids. The valve utilizes a replaceable valve cartridge that can be inserted and removed from a top of a valve body that contains inlet and outlet ports of the valve. The valve cartridge includes a valve seat and carries a movable valve member and associated actuating piston that moves the valve member into and out of engagement with the valve seat. The valve also includes a port plate that closes the opening through which the cartridge is inserted into the valve body.

The port plate preferably has multiple ports for attachment of one or more functional control components for changing valve functionality.

The port plate preferably has a central valve stem port through which a valve stem extends. The valve stem is axially aligned with the central axis of the piston and may be operated to manually open or close the valve. This allows for adequate force to be provided so that the valve may be opened even in cases of severe sticking of the movable valve member. The stem port may serve as a guide for the valve stem keeping it coaxially aligned with the piston so as to prevent side loads from acting on the piston that might cause binding. The valve stem may protrude from the top of the port plate to form a plunger that is easily accessible for manual manipulation. The valve stem may be suitably sealed to the port plate to prevent leakage from the valve along the valve stem. A plunger cover, that may be sealingly attached to the port plate, surrounds the protruding top end portion of the valve stem to allow for manipulation of the valve stem while preventing contaminants from attacking the valve stem and/or seals.

In a preferred embodiment, the port plate includes multiple ports. The ports are angled relative to the central axis of the valve. This allows for functional control elements such as regulators, solenoids, etc. to be coupled to or removed from the port plate without interference from the manually operable stem or other control elements coupled to the port plate. The angular arrangement of the ports also allows access to the fasteners used to attach the port plate to the valve body, making possible removal of the port plate without having to remove any control elements mounted to the port plate at angular mounting faces.

At least one of the ports, a bonnet assembly port, is configured for connection to a bonnet assembly including a pilot body or solenoid. The port plate may also include additional ports configured to be coupled, for example, to a plug to block the port or to a pilot body or a solenoid to control operation of the valve. The valve may be formed from a corrosion resistant and weld-in material such as stainless steel.

According to one aspect of the invention, a valve for a refrigeration system includes a valve body having an inlet, and outlet and a valve seat, and a cavity. The valve also includes a port plate removably coupled to the valve body, and an inlet pressure passageway in fluid communication with the inlet port of the valve body and an outlet pressure passageway in fluid communication with the outlet port, such that the port plate functions to control a piston to open and close the valve, a cartridge disposed within the cavity of the valve body, the cartridge being accessible without disconnecting the valve from the system by removing the port plate from the valve body, the cartridge having a piston that engages the valve seat to close the valve and that disengages the valve seat to open the valve, and a regulator for setting an actuation pressure of the valve, the regulator coupled to the port plate and having a passageway in communication with a passageway through the port plate to the cavity. The port plate can be positioned on the valve body in one of a number of different configurations to convert the valve from solenoid operation, to regulator operation, or to regulator operation with multiple functional features.

In one embodiment, the valve further includes a manual opening mechanism coupled to the valve stem for manually moving the piston to open and close the valve, wherein the manual opening mechanism extends through an opening in the port plate that is in axial alignment with the piston.

In another embodiment, the valve includes a strainer coupled to the valve body such that flow through the inlet of the valve body passes through the strainer.

In another aspect of the invention, a port plate for a valve includes a first port extending through the port plate along a first axis that is angularly offset from the central axis of the port plate, a second port extending through the port plate along a second axis that is angularly offset from the central axis, and a third port extending through the port plate along a third axis that is angularly offset from the central axis. The offset of the respective axes of the respective ports through the port plate allow a subassembly to be coupled to and removed from one of the ports in the port plate without interference from subassemblies coupled to other ports in the port plate.

In yet another aspect of the invention, a valve for a refrigeration system includes a valve body having an inlet port, an outlet port, and walls forming a main cavity, a cartridge configured to reside within the main cavity and having a cylinder in which a piston is movable in a first direction to permit fluid flow from the inlet port to the outlet port and in a second direction to impede fluid flow from the inlet port to the outlet port, and a port plate removably mounted to the valve body for closing an end opening of the main cavity through which the cartridge can be inserted into and removed from the main cavity, the port plate including a plurality of functional ports, each functional port configured to accept at least one of plural valve control elements configured to control the piston to permit or impede the fluid flow from the inlet port to the outlet port, each functional port being disposed at an acute angle relative to a central axis of the piston so that a functional component mounted to a respective functional port will not block access to fasteners securing the port plate to the valve body so that the port plate can be removed from the valve body without removal of the control element or control elements from the port plate.

In one embodiment, the cartridge residing within the main cavity becomes accessible without disconnecting the valve from the refrigeration system by removing the port plate from the valve body.

In another embodiment, the valve body has an inlet pressure passageway and the port plate and the cartridge have walls forming part of an annular passageway, the inlet pressure passageway and the annular passageway in fluid communication with the inlet port, wherein fluid pressure from the inlet port controls the piston to permit or impede the fluid flow from the inlet port to the outlet port.

In yet another embodiment, each of the ports is configured to accept one of various valve control elements for the valve to be configurable in a number of different configurations including a configuration simultaneously including a solenoid control and a regulator operation.

In one embodiment, the acute angle is 25 degrees, 35 degrees, 45 degrees, 55 degrees, 65 degrees, or a range of from 25 degrees to 65 degrees.

In another embodiment, the valve includes a manual opening mechanism including a valve stem and configured for manually moving the piston to permit or impede the fluid flow from the inlet port to the outlet port, wherein at least a portion of the manual opening mechanism extends through an opening in the port plate that is in axial alignment with the piston.

In yet another embodiment, the cartridge includes a cartridge body forming a housing and having a seat, an elongated stem having a radially enlarged head portion for sealing against a seat, and the piston extending radially outward from the stem at an end of the stem opposite the radially enlarged head portion. The cartridge body includes a shelf between the radially enlarged head portion and the piston, the shelf portion having a relief hole for fluid flow into and out of a chamber formed by a surface of the piston and an upper surface of the shelf.

In one aspect of the invention, a valve for a refrigeration system includes a valve body having an inlet port, an outlet port, and walls forming a main cavity, a cartridge configured to reside within the main cavity and having a cylinder in which a piston is movable in a first direction to permit fluid flow from the inlet port to the outlet port and in a second direction to impede fluid flow from the inlet port to the outlet port, a port plate removably mounted to the valve body for closing an end opening of the main cavity through which the cartridge can be inserted into and removed from the main cavity, the port plate including a plurality of functional ports, each functional port configured to accept at least one of plural valve control elements configured to control the piston to permit or impede the fluid flow from the inlet port to the outlet port, an inlet pressure passageway in fluid communication with the inlet port, and an annular passageway formed by an annular groove at the interface of the valve body and the port plate and in fluid communication with the inlet pressure passageway and the functional ports for the valve control elements to block or allow a pilot fluid flow to control the piston to thereby control the valve.

In another aspect of the invention, a valve for a refrigeration system includes a valve body having an inlet port, an outlet port, and walls forming a main cavity, a cartridge configured to reside within the main cavity and having a piston configured to travel in a first direction to permit fluid flow from the inlet port to the outlet port and in a second direction to impede fluid flow from the inlet port to the outlet port, a port plate configured to removably couple to the valve body to substantially close an end of the main cavity substantially enclosing the cartridge within the main cavity, the port plate including a plurality of ports, each port configured to accept at least one of various valve control elements configured to control the piston to permit or impede the fluid flow from the inlet port to the outlet port, and a manual opening mechanism including a valve stem and configured for manually moving the piston to permit or impede the fluid flow from the inlet port to the outlet port, wherein at least a portion of the manual opening mechanism extends through an opening in the port plate that is in axial alignment with the piston.

In yet another aspect of the invention, the cartridge residing within the main cavity becomes accessible without disconnecting the valve from the refrigeration system by removing the port plate from the valve body, and wherein each port is disposed at an acute angle relative to a central axis of the piston thereby allowing access to fasteners of the port plate such that the port plate is removable from the valve body without removal of the control elements from the ports.

In one embodiment, the valve body has walls forming part of an inlet pressure passageway and the port plate and the cartridge have walls forming part of an annular passageway, the inlet pressure passageway and the annular passageway in fluid communication with the inlet port, wherein fluid pressure from the inlet port controls the piston to permit or impede the fluid flow from the inlet port to the outlet port.

In one aspect of the invention, a cartridge for a valve includes a cartridge body forming a piston chamber and a valve seat, a valve member for sealing against the valve seat, and a piston movable axially in the piston chamber and connected coaxially to the valve member for moving the valve member. The cartridge body includes a shelf interposed between the valve member and the piston so as to block the flow of fluid passing through the valve seat from directly impinging on the piston, and at least one relief flow passage fluidly connecting fluid pressure from a valve seat side of the shelf to a piston side of the shelf.

In one embodiment, the valve member is connected to the piston by a valve stem extending through an opening in the shelf.

In another embodiment, a spring is interposed between the piston and shelf for biasing the valve member against the valve seat.

In yet another embodiment, the cartridge body has a shoulder for engaging a corresponding shoulder of a valve body for axially positioning the cartridge in the valve body, and the cartridge further has a nose portion having a width less than the width of the shoulder and forming at its distal end the valve seat.

In one embodiment, the relief flow passage opens to a reduced diameter side wall of the cartridge.

BRIEF DESCRIPTION OF THE DRAWINGS

Embodiments of this invention will now be described in further detail with reference to the accompanying drawings.

DETAILED DESCRIPTION

Figure 1A:
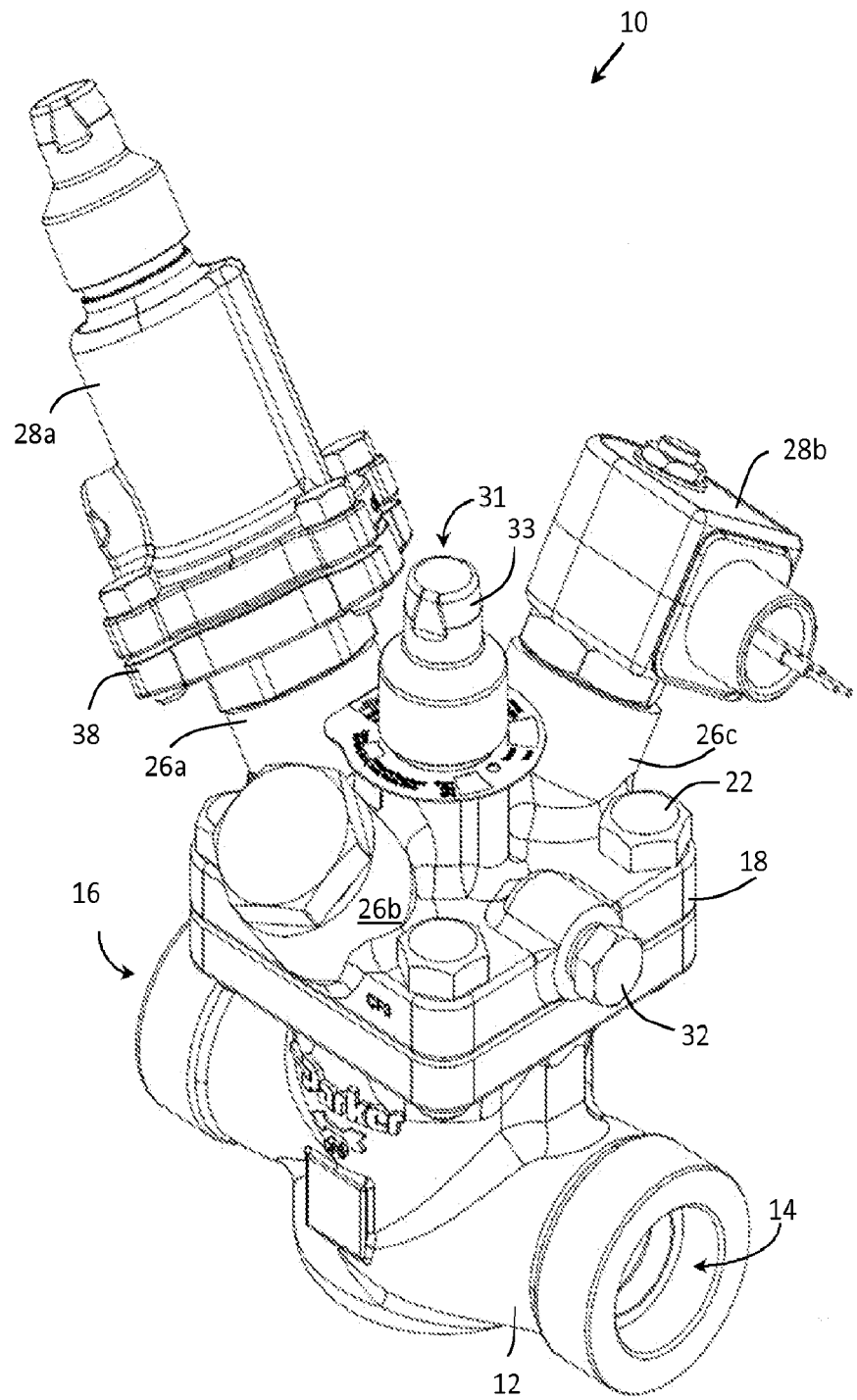
FIG. 1A illustrates a perspective view of an exemplary pilot operated valve.
Figure 1B:
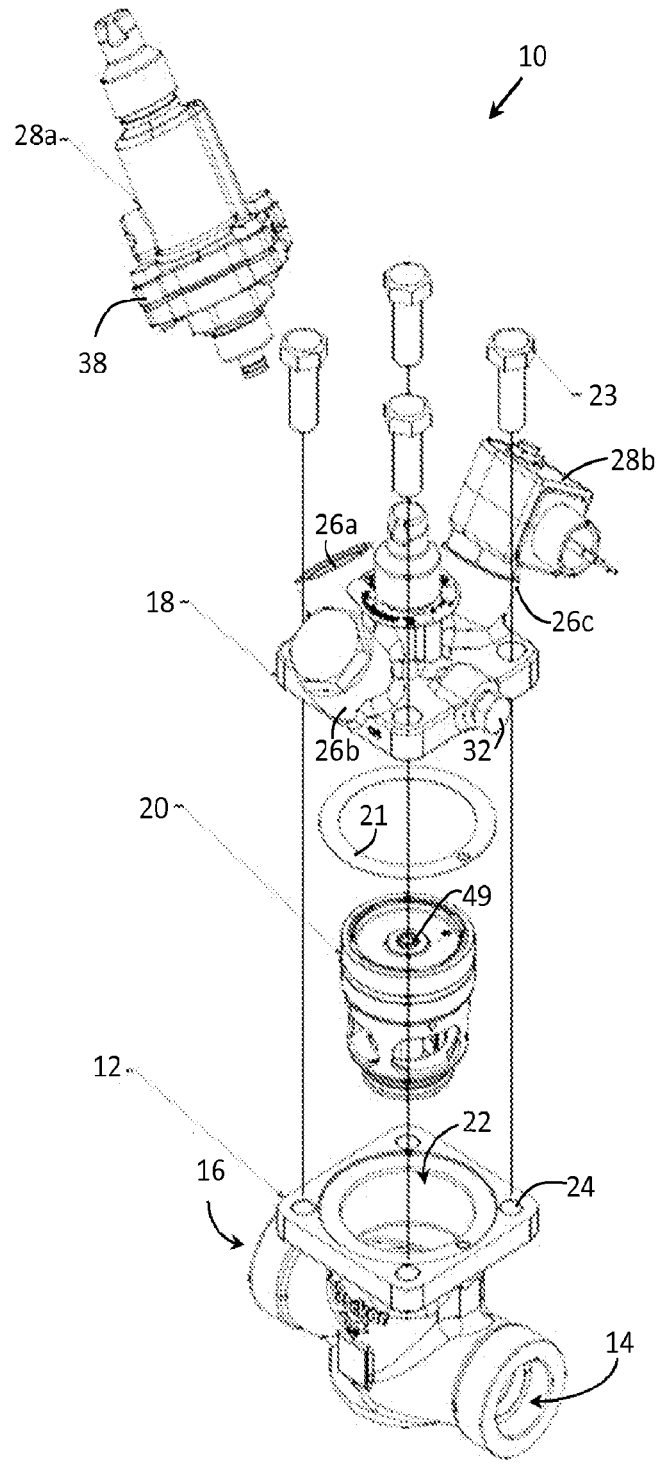
FIG. 1B illustrates a top view of the exemplary pilot operated valve of FIG. 1A.
Figure 1C:
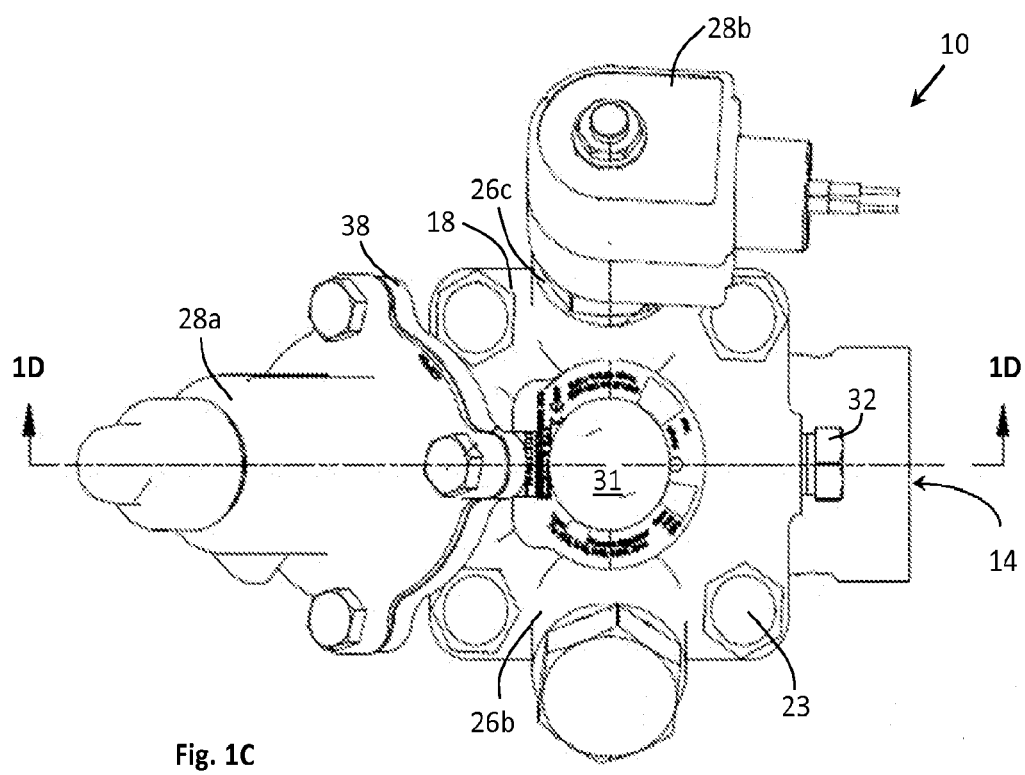
FIG. 1C illustrates a cross-sectional view of the exemplary pilot operated valve of FIG. 1A.

FIGS. 1A-1E illustrate an exemplary pilot operated valve 10. The valve 10 includes a valve body 12 that has an inlet port 14 and an outlet port 16. In one embodiment, the valve 10 is a weld-in corrosion resistant valve whose valve body 12 is constructed from stainless steel. The valve body 12 may be secured in a pipeline (not shown) in a relatively permanent manner, such as via welding, making it an integral part of the system piping. Connecting the valve 10 to the overall system in this manner reduces or eliminates the possibility of leakage between the valve 10 and the piping and reduces the man hours in installation.

The valve 10 also includes a port plate 18 and a cartridge 20. The valve body 12 has a main cavity 22 within which the cartridge 20, which is discussed in more detail below, may reside. The port plate 18 removably couples to the valve body 12 to substantially close the main cavity 22 substantially enclosing the cartridge 20 within the main cavity 22. In the illustrated embodiment, a seal ring 21 is provided between the port plate 18 and the valve body 12.

Once the valve body 12 is welded in place, the internal components of the valve 10 insert into the cavity 22 of the valve body 12 in the form of the cartridge 20. In the illustrated embodiment, the cartridge 20 is trapped in place in the cavity 22 by coupling of the port plate 18 to the valve body 12 via suitable means. In the illustrated embodiment, the port plate 18 couples to the valve body 12 by means of the bolts 23 and the built-in threads 24.

External portions of upper walls 41 of the cartridge 20 abut against internal portions of upper walls 13 of the valve body 12. An annular seal 25 seals between the external upper walls 41 of the cartridge 20 and the internal upper walls 13 of the valve body 12. The valve body 12 includes a dividing wall 15 that has an opening through which a nose 43 of the cartridge 20 is inserted. Upon insertion of the cartridge 20, a shoulder 45 in the nose 43 of the cartridge 20 rests on an annular shoulder 17 of the dividing wall 15. A suitable seal 47 seals between the nose 43 and the dividing wall 15.

Once the valve 10 is in place, the internal components of the valve 10 may be serviced by removing the replaceable cartridge 20. Access to the cartridge 20 may be gained by removing the port plate 18 by first removing the bolts 23 that screw into the built-in screw thread 24 on the valve body 12.

To assist in the removal of the cartridge 20, the cartridge 20 may include a threaded portion 49 to which a tool (e.g., a bolt) may be threaded to axially remove the cartridge 20.

The port plate 18 includes functional ports 26 that are each configured to accept one of various valve control elements 28 that control a piston 30 of the cartridge 20 to permit or impede fluid flow from the inlet port 14 to the outlet port 16. The port plate 18 and specifically the functional ports 26 allow for easy conversion of the valve's functionality.

In the illustrated embodiment, the control element 28a is a regulator or pilot body coupled to the functional port 26a. The control element 28b is a solenoid coupled to the functional port 26c. In other embodiments, as discussed below, the valve 10 may include control elements in addition to or different from the pilot body 28a and the solenoid 28b. Moreover, control elements may be coupled to any of the functional ports 26a, 26b, and 26c in various combinations.

Each of the functional ports 26 is disposed at an acute angle $\alpha$ relative to a central axis x of the valve 10 allowing access to the bolts 23 such that the port plate 18 is removable from the valve body 12 without removal of the control elements 28 from the functional ports 26. In this way, the cartridge 20 may be removed from the cavity 22 and serviced or replaced without removal of the control elements 28 from the functional ports 26 and without disturbing the valve body 12 or any piping.

In one embodiment, the acute angle $\alpha$ is approximately 35°. In other embodiments, the acute angle is approximately one of 25°, 35°, 45°, 55° and 65°. In another embodiment, the acute angle is in the range of from 25° to 65°. This allows the control elements 28 to be somewhat spaced apart from one another such that they can be coupled to the port plate 18 by a suitable (e.g., threaded) connection and added or removed from the functional port 26 without interference.

Once the valve body 12 is installed in the piping system all servicing and adjustments may be performed from the top side of the valve 10. This simplifies and reduces insulating costs as only one side of the valve needs to be left exposed. Having all adjustments and service requirements on the top side of the valve 10 also saves time for service mechanics because they are not working upside down, or in blind situations.

The port plate 12 may also include a gauge port 32 located in line (e.g., parallel) to the flow path into and out of the valve body 12 through the inlet and outlet 14 and 16, respectively.

The pilot body 28a may include a regulator, such as a diaphragm regulator, for setting the actuation pressure of the valve 10 for controlling whether the valve 10 is open or closed. Fluid flows from the inlet 14 to an inlet passageway 34 to an annular passageway 36 that is formed by an annular groove in the interface between the valve body 12 and the port plate 18. The annular passageway 36 has openings 37 associated with the functional ports 26b and 26c. Through the openings 37 the control elements 28 may block or allow pilot fluid flow to control the valve 10.

From the annular passageway 36, the fluid flows to an inlet of the pilot body 28a to the regulator. Upon overcoming the regulator pressure, the fluid flows to an outlet of the pilot body 28a that is in communication with the top of the piston 30 in the cartridge 20 via the opening 39. The pilot flow allows the piston 30 to be opened or closed according to the pressure set by the regulator in the pilot body 28a.

Therefore, actuation of the valve 10 may be accomplished through the utilization of pressure from within the system. Pressure is routed internally through the valve 10 and applied to the piston 30.

Pressure at the top of the piston 30 eventually overcomes the force of the spring 40 and drives the valve open. The area differences and spring forces are calculated such that a very small pressure difference between the inlet side 14 and outlet side 16 of the valve is required for opening. In one embodiment, the pressure difference between the inlet side 14 and outlet side 16 required for opening of the valve is 2 psi.

The pilot body 28a may be coupled to the port plate 18 via an intermediary mounting plate and bolt assembly 38. This assembly 38 allows the pilot body 28a to be coupled to the port plate 18 without a threaded connection between them. This allows the pilot body 28a to be removed from the valve 10 without rotation and without interfering with other control elements coupled to the top of the port plate 18.

The port plate 18 preferably has a central valve stem port 31 through which a valve stem 42 extends. The valve stem 42 is axially aligned with the central axis x of the piston 30 and may be operated to manually open or close the valve 10. This allows for adequate force to be provided so that the valve 10 may be opened even in cases of severe sticking of the movable valve member 46.

The stem port 31 may serve as a guide for the valve stem 42 keeping it coaxially aligned with the piston 30 so as to prevent side loads from acting on the stem 42 that might cause binding. The valve stem 42 may protrude from the top of the port plate 18 to form a plunger that is easily accessible for manual manipulation. The valve stem 42 may be suitably sealed to the port plate 18 while allowing movement of the stem 42 to prevent leakage from the valve 10 along the valve stem 42. In the illustrated embodiment, this seal is provided by packing 55 secured in place by a packing retainer 57.

In the illustrated embodiment, a plunger cover 33, that may be sealingly attached to the port plate 18, surrounds the protruding top end portion of the valve stem 42 to allow for manipulation of the valve stem 42 while preventing contaminants from attacking the valve stem 42 and/or seals.

This particular location of the stem 42 provides an advantage to the manual operation of the valve 10. As compared to a manual stem that is offset from the axis of the piston 30, for example, locating the stem 42 centrally over the axis of the piston 30 minimizes the chance of the piston 30 binding when manually actuated. Allowing access at the top may, once again, be cost and time efficient in terms of ease of service and access. By pushing in the middle of the piston 30 the stem 42 also exerts substantially equally distributed force on the piston 30.

Figure 1D:
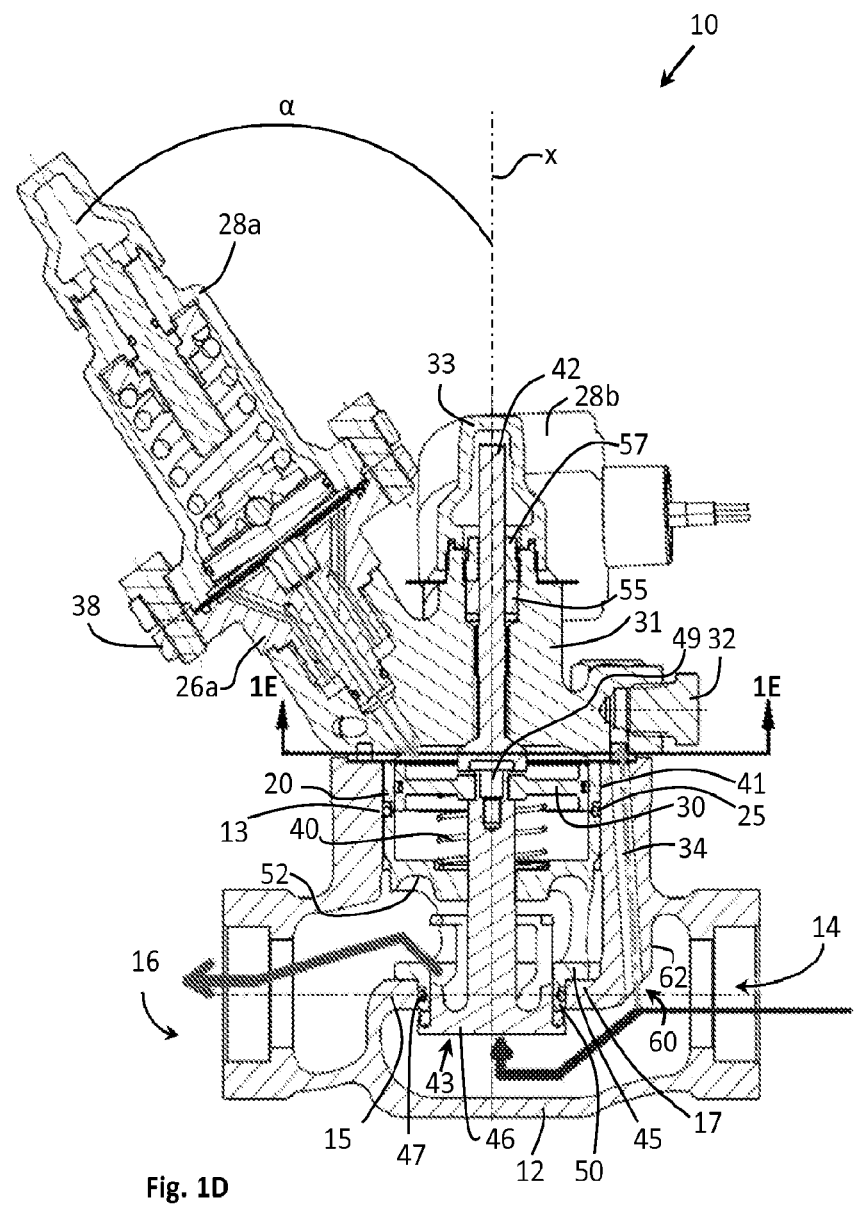
FIG. 1D illustrates another cross-sectional view of the exemplary pilot operated valve of FIG. 1A.
Figure 1E:
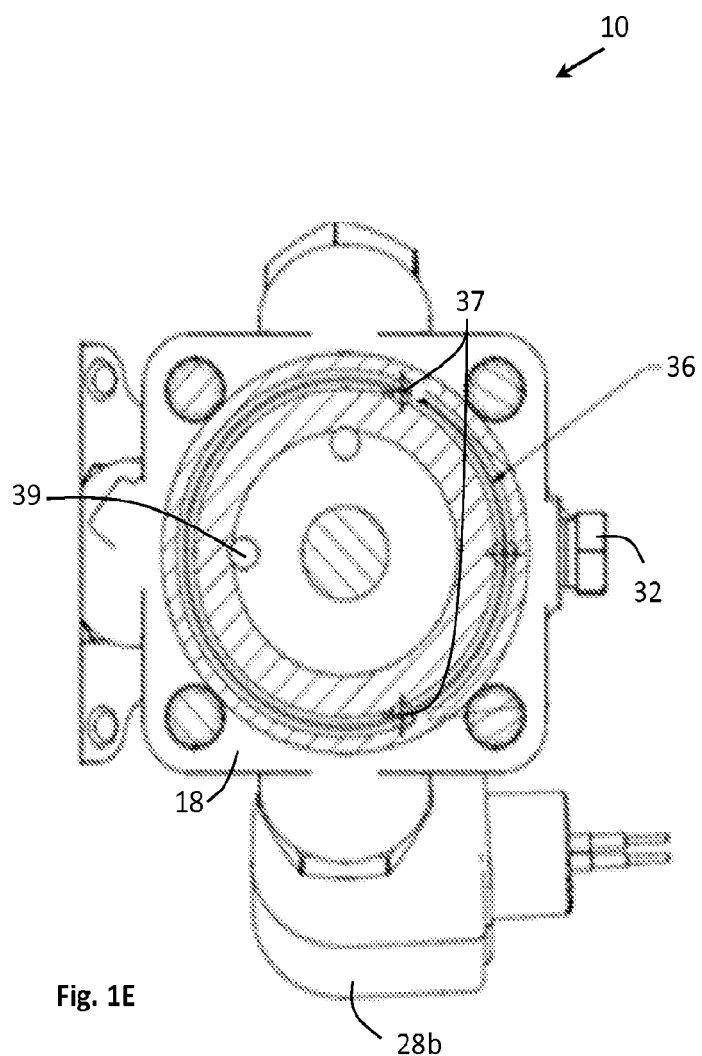
FIG. 1E illustrates yet another cross-sectional view of the exemplary pilot operated valve of FIG. 1A.
Figure 1F:
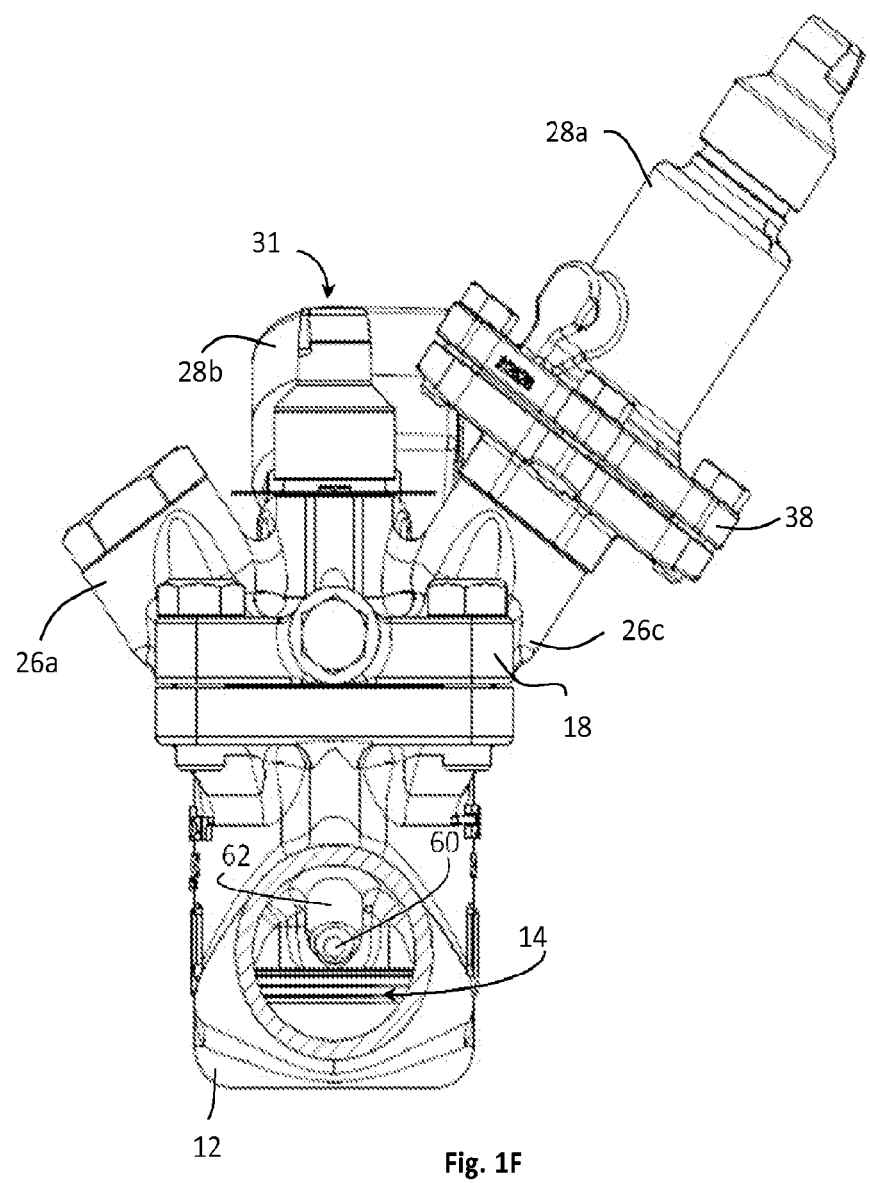
FIG. 1F illustrates still another cross-sectional view of the exemplary pilot operated valve of FIG. 1A.

With reference to the embodiment of FIG. 1F and continued reference to FIG. 1D, the passageway 34 has an entrance or mouth 60 that resides on a chamfered surface. Moreover, a portion 62 of the valve body 12 that forms and/or surrounds the passageway 34 and generally faces in the direction of the inlet port 14 resembles a cylindania or half tube or half cylinder. The chamfer-shaped mouth 60 and the cylindania-shaped portion 62 of the valve body 12 are so shaped to eliminate or reduce the chances that dirt or other contaminants entering the valve body 12 through the inlet port 14 enter the pilot flow through the mouth 60 of the passageway 34. Dirt or other contaminants in the pilot flow may negatively affect the performance of the valve 10.

Figure 2A:
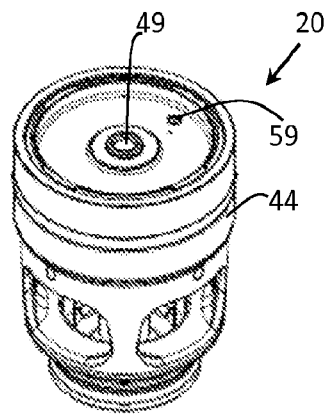
FIG. 2A illustrates a perspective view of an exemplary cartridge.
Figure 2B:
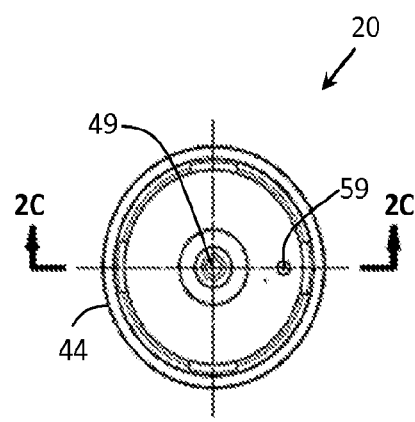
FIG. 2B illustrates a top view of the cartridge of FIG. 2A.
Figure 2C:
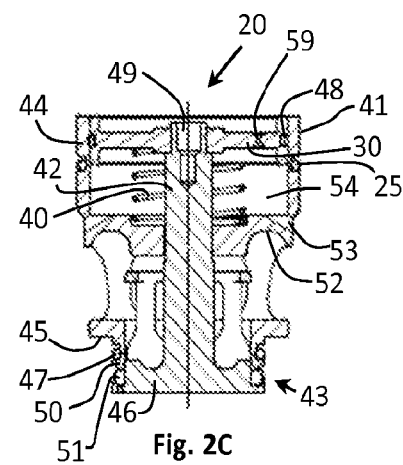
FIG. 2C illustrates a cross-sectional view of the cartridge of FIG. 2A.

With reference to FIGS. 2A-2C and continued reference to FIGS. 1A-1E, FIGS. 2A-2C illustrate an exemplary cartridge 20. The cartridge 20 includes a cartridge body 44, the piston 30, a movable valve member 46 and the spring 40. The cartridge 20 also includes piston rings 48 and a valve seat 50.

The cartridge body 44 has a shoulder 45 that engages a corresponding shoulder 17 of the valve body 12 so that the cartridge 20 is axially positioned in the valve body 12. The cartridge 20 also has a nose portion 43 that has a width less than the width of the shoulder 45 and that forms at its distal end the valve seat 50.

The cartridge body 44 forms a piston chamber 54 within which the piston 30 moves. The piston 30 is connected coaxially with the movable valve member 46. The piston 30 moves the movable valve member 46 into and out of engagement with the valve seat 50. The valve member 46 includes a valve seal 51 that engages the valve seat 50 for the valve member 46 to seal against the valve seat 50 when the valve 10 is closed to prevent fluid flow.

The valve member 46 may be a radially enlarged portion of the stem 42 or may be coupled to the stem 42 via a threaded, friction or crimp fit.

The piston 30 extends radially outward from the stem 42. The piston 30 may be coupled to the stem 42 via a frictional or crimp fit such that the piston 30 moves with the stem 42. Therefore, the stem 42, the valve member 46 and the piston 30 move relative to the cartridge body 44 as a single piece.

An outer diameter of the piston 30 protrudes radially outwards for engaging internal cartridge walls. The cartridge includes the piston seal ring 48 that engages the internal cartridge walls to seal against the internal cartridge walls. The piston 30 further includes a regulation hole 59 that serves to facilitate regulation of fluid pressure between volumes above and below the piston 30.

The cartridge body 44 also has a shelf 52 interposed between the valve member 46 and the piston 30. The shelf 52 has a relief hole 53 for fluid flow into and out of the chamber 54 formed by a bottom surface of the piston 30 and an upper surface of the shelf 52. The relief hole 53 opens to a reduced diameter side wall of the cartridge 20.

The shelf 52 protects the piston 30 from the tremendous dynamic loading that may be generated in the presence of, for example, two phase flow. The two phase flow would, in prior art designs, directly impinge on the piston 30. The design of the cartridge 30 with the shelf 52 provides a barrier for the fluid flow so that the fluid flow does not impact the piston 30 directly. This significantly reduces the chances of vibration which could lead to audible noise and possible reduced life of the valve 10 due to excess wear.

The spring 40 is interposed between the piston 30 and the shelf 52 to bias the valve member 46 against the valve seat 50.

In the example of FIGS. 1A-1E, the port plate 18 is configured with the pilot body 28a and the solenoid 28b. In that example, the particular combination of the solenoid 28b and the pilot body 28a creates a valve which operates as a regulator (e.g., the operation of the pilot body 28a), but also has an on/off feature (e.g., the operation of the solenoid 28b) to force the valve 10 to stay shut at desired times.

By changing the number and/or locations of solenoids, pilot bodies, plugs, etc. on the functional ports 26a-c of the port plate 18, the valve 10 may be converted from simple solenoid operation, for example, to a regulator, or a regulator with multiple functional features by blocking fluid flow passages or allowing fluid flow through to make the valve 10 respond differently under different conditions. Again, this conversion can be completed by simply re-configuring which control elements are coupled to the port plate 18 and without disturbing the valve body 12 or system piping.

FIGS. 3A-3E illustrate other exemplary combinations of control elements 28 installed in the functional ports 26.

Figure 3A:
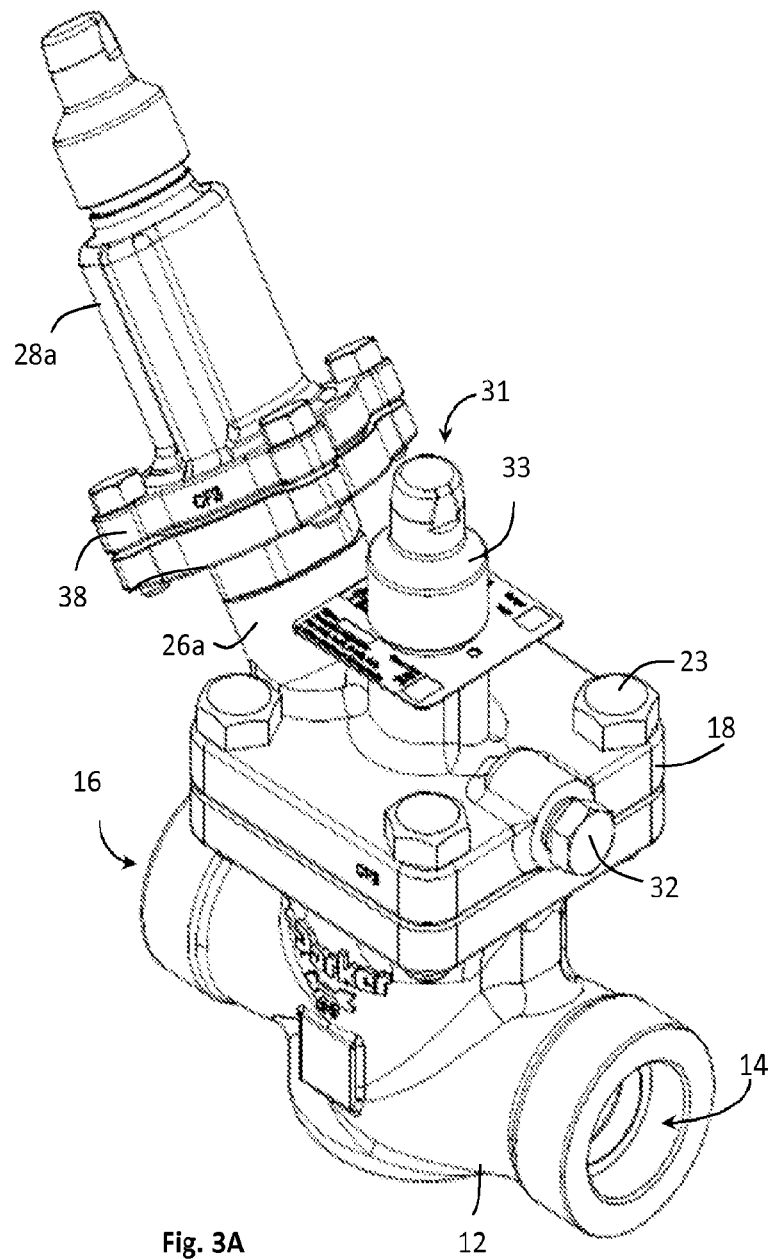
FIG. 3A illustrates an exemplary valve in which the port plate has installed a pilot body.

FIG. 3A illustrates an example where the port plate 18 has installed only a pilot body 28a. In this embodiment, the valve 10 is forced to build pressure on the inlet side 14 of the valve 10. This causes the pilot pressure to have to overcome the setting spring in the pilot body 28a before the valve 10 opens. Thus, this combination creates a simple pressure regulator valve.

Figure 3B:
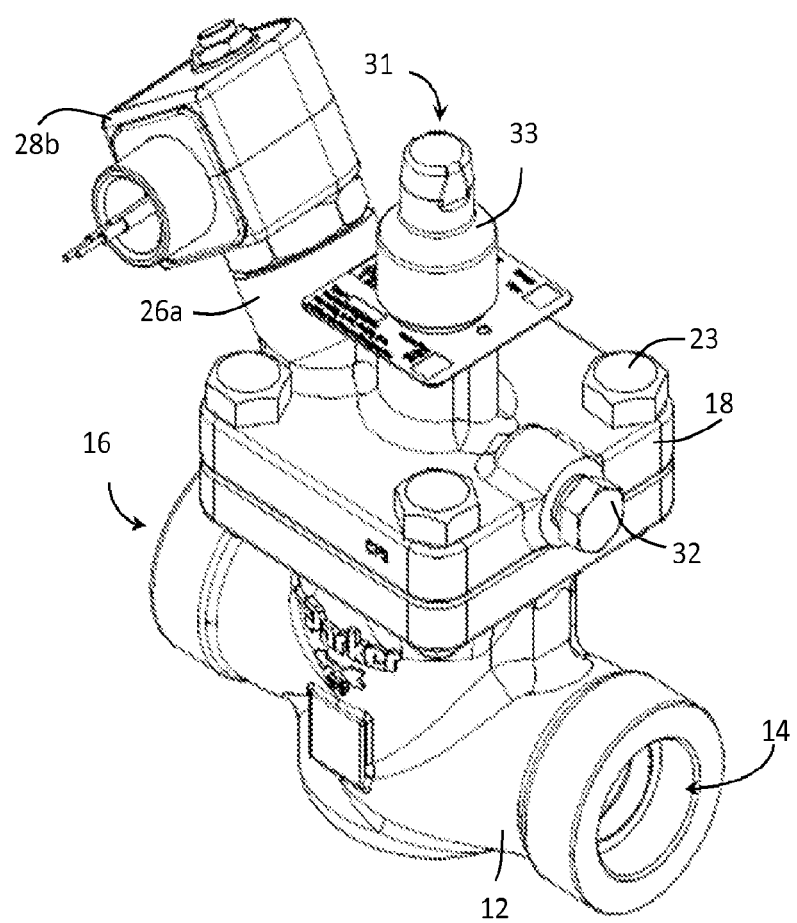
FIG. 3B illustrates an exemplary valve in which the port plate has installed a solenoid.

FIG. 3B illustrates an example where the port plate 18 has installed only an electrically actuated solenoid 28b. In this embodiment, the valve 10 is forced to stay either open or closed (depending on the solenoid 28b setting) until the solenoid 28b receives an electrical signal to change state. Thus, this combination creates an on/off switch valve.

Figure 3C:
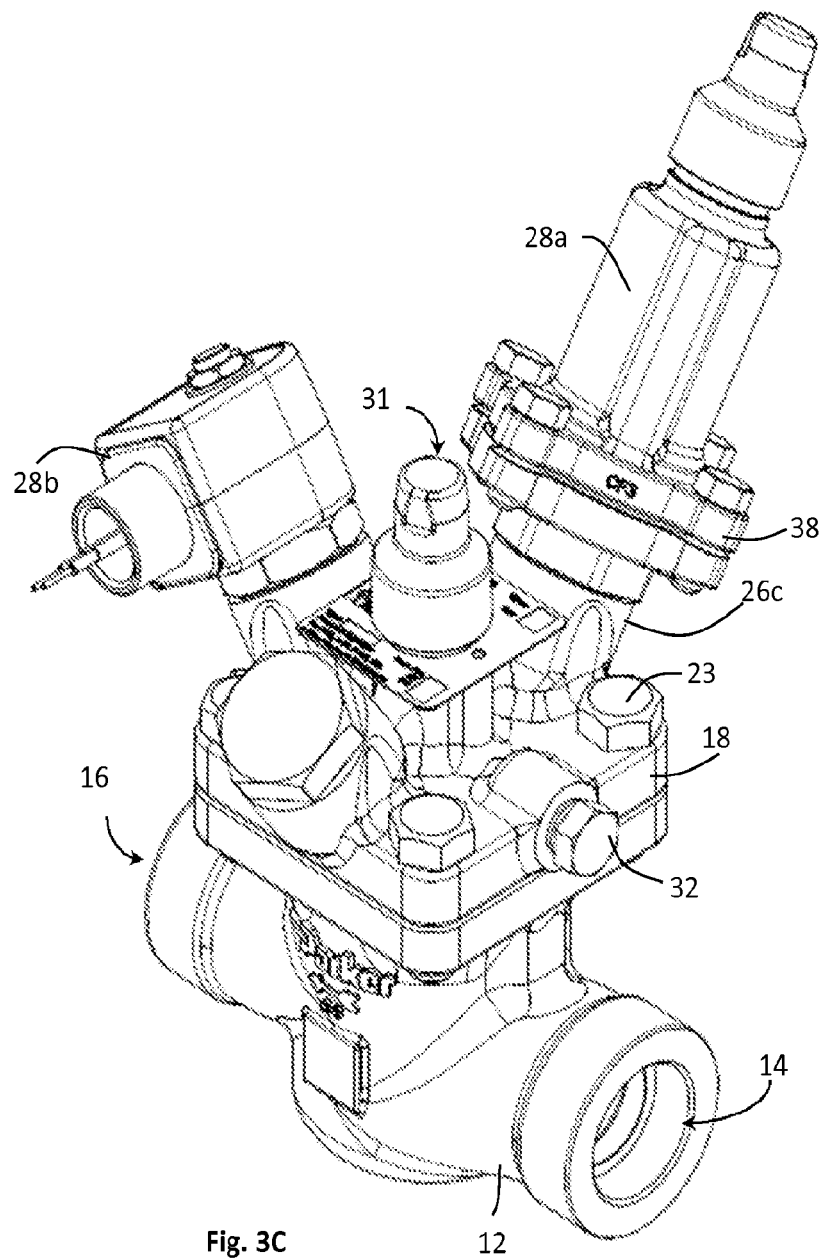
FIG. 3C illustrates an exemplary valve in which the port plate has installed a pilot body and a solenoid.

FIG. 3C illustrates an example where the port plate 18 has installed a pilot body 28a and an electrically actuated solenoid 28b similar to the embodiment of FIGS. 1A-1E. However, the location of the pilot body 28a and the solenoid 28b affect the behavior of the valve 10. The combination of FIG. 3C creates a regulator (e.g., the operation of the pilot body 28a), which can be forced to open regardless of the pressure to the pilot body 28a by operation of the solenoid 28b. This may be done in cases of defrost, for example.

Figure 3D:
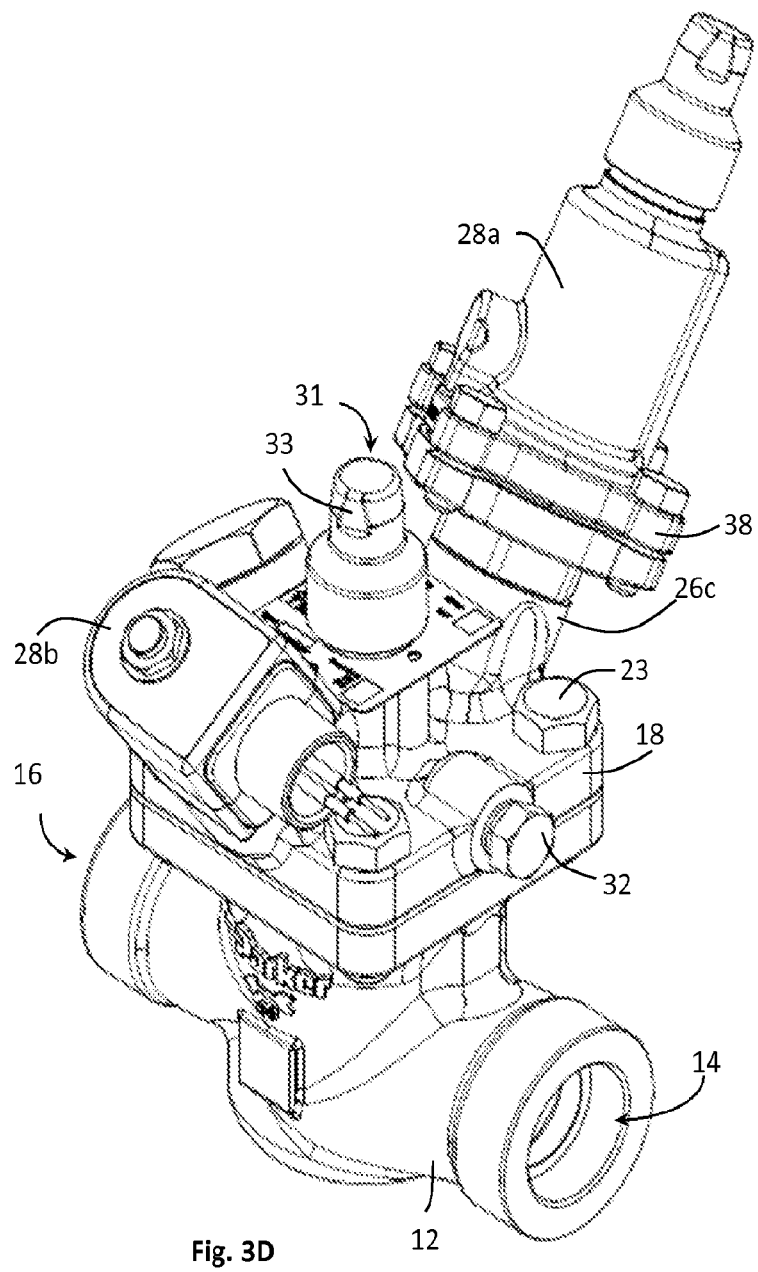
FIG. 3D illustrates an exemplary valve in which the port plate has installed a pilot body and a solenoid in a different configuration from that of FIG. 3C.
Figure 3E:
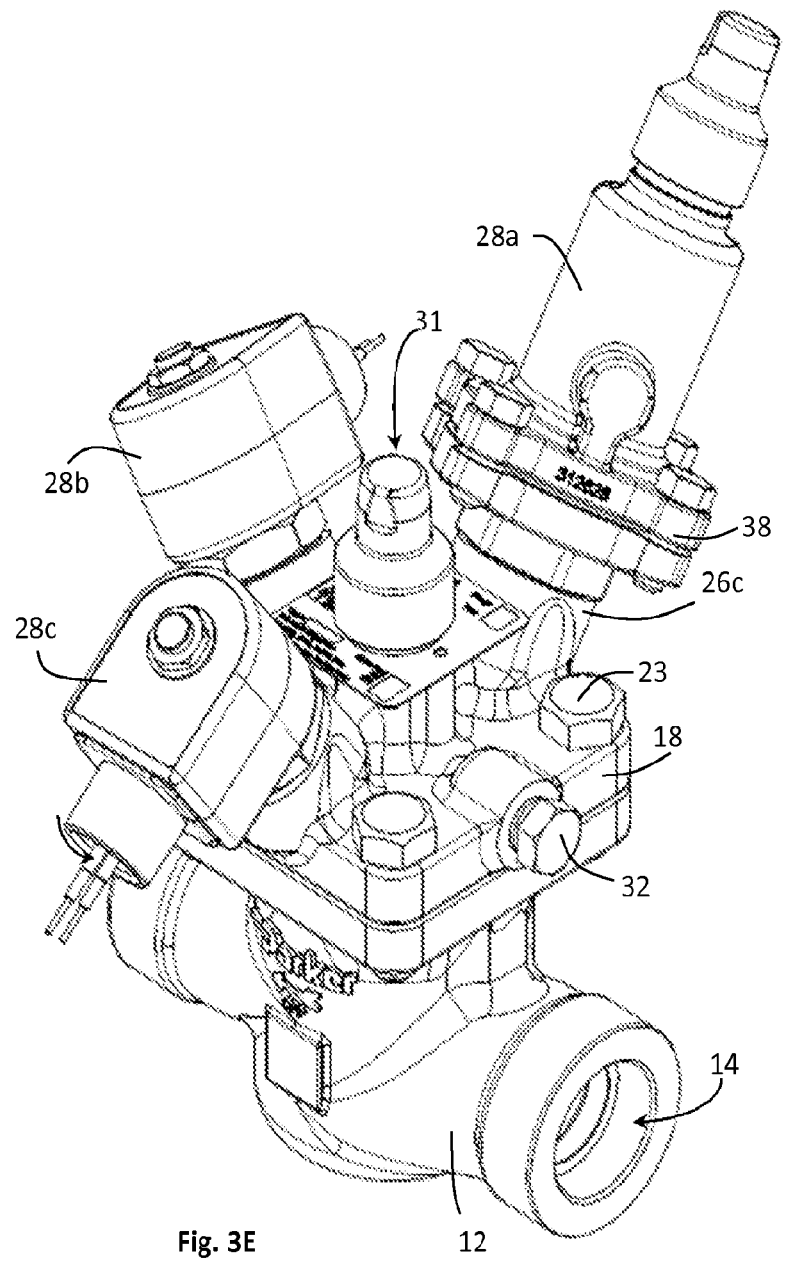
FIG. 3E illustrates an exemplary valve in which the port plate has installed a pilot body and two solenoids.

Other combinations including the combinations illustrated in FIGS. 3D and 3E are possible. FIG. 3D illustrates a valve with a port plate 18 that has installed a pilot body 28a and a solenoid 28b. FIG. 3E illustrates a valve with a port plate 18 that has installed a pilot body 28a and two solenoids 28b and 28c. In addition, other combinations are possible such as, for example, two pilot bodies and a solenoid on the port plate 18 to create a valve which is capable of controlling at two different pressure settings.

As should be appreciated, the valve 10 may have any of these features alone or in combination with one another by simply changing the arrangement of the control elements on the port plate 18.

Figure 4:
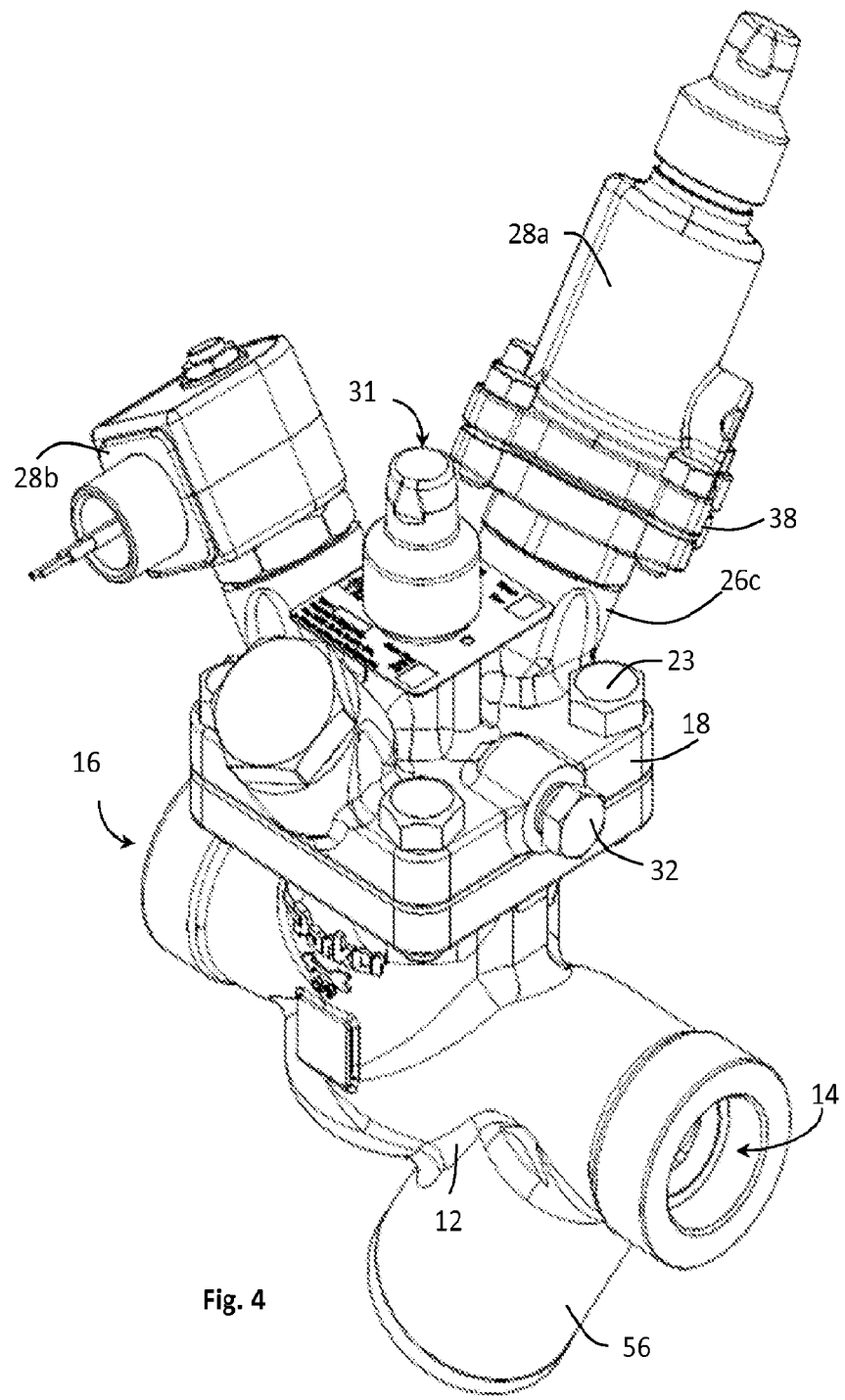
FIG. 4 illustrates an exemplary valve in which the valve body includes an integrated strainer.

FIG. 4 illustrates an embodiment where the valve body 12 includes an integrated strainer 56. By having the strainer 56 at an angle to the body 12, the projected area of the inlet cross section to the strainer 56 is increased. This relative increase in the cross section reduces pressure drop and improves the overall flow coefficient (Cv) value of the valve 10.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention.

The invention claimed is:

1. A valve for a refrigeration system comprising:
a valve body having an inlet, and outlet, and a valve seat, and a cavity;
a port plate removably coupled to the valve body, and an inlet pressure passageway in fluid communication with the inlet port of the valve body and an outlet pressure passageway in fluid communication with the outlet port, such that the port plate functions to control a piston to open and close the valve;
a cartridge disposed within the cavity of the valve body, the cartridge being accessible without disconnecting the valve from the system by removing the port plate from the valve body, the cartridge having a piston that engages the valve seat to close the valve and that disengages the valve seat to open the valve;
a regulator for setting an actuation pressure of the valve, the regulator coupled to the port plate and having a passageway in communication with a passageway through the port plate to the cavity; and
a manual opening mechanism including a valve stem for manually moving the piston to open and close the valve, the manual opening mechanism extending through an opening in the port plate that is in axial alignment with the piston,
wherein the port plate is configured for removably coupling to the valve body in one of a number of different configurations for converting the valve from solenoid operation, to regulator operation, or to regulator operation with multiple functional features.

2. The valve of claim 1, further comprising a strainer coupled to the valve body such that flow through the inlet of the valve body passes through the strainer.

3. The valve of claim 1, wherein the port plate includes
a first port extending through the port plate along a first axis that is angularly offset from a central axis of the port plate;
a second port extending through the port plate along a second axis that is angularly offset from the central axis; and
a third port extending through the port plate along a third axis that is angularly offset from the central axis;
wherein the offset of the respective axes of the respective ports through the port plate allows a subassembly to be coupled to and removed from one of the ports in the port plate without interference from subassemblies coupled to other ports in the port plate.

4. A valve for a refrigeration system comprising:
a valve body having an inlet port, an outlet port, and walls forming a main cavity;
a cartridge configured to reside within the main cavity and having a cylinder in which a piston is movable in a first direction to permit fluid flow from the inlet port to the outlet port and in a second direction to impede fluid flow from the inlet port to the outlet port; and
a port plate removably mounted to the valve body for closing an end opening of the main cavity through which the cartridge can be inserted into and removed from the main cavity, the port plate including a plurality of functional ports, each functional port configured to accept at least one of plural valve control elements configured to control the piston to permit or impede the fluid flow from the inlet port to the outlet port, each functional port being disposed at an acute angle relative to a central axis of the piston so that a valve control element mounted to a respective functional port will not block access to fasteners securing the port plate to the valve body so that the port plate can be removed from the valve body without removal of the control element or control elements from the port plate.

5. The valve of claim 4, wherein the cartridge residing within the main cavity becomes accessible without disconnecting the valve from the refrigeration system by removing the port plate from the valve body.

6. The valve of claim 4, wherein the valve body has an inlet pressure passageway and the port plate and the cartridge have walls forming part of an annular passageway, the inlet pressure passageway and the annular passageway in fluid communication with the inlet port, wherein fluid pressure from the inlet port controls the piston to permit or impede the fluid flow from the inlet port to the outlet port.

7. The valve of claim 4, wherein each of the ports is configured to accept one of various valve control elements for the valve to be configurable in a number of different configurations including a configuration simultaneously including a solenoid control and a regulator operation.

8. The valve of claim 4, wherein the acute angle is 25 degrees, 35 degrees, 45 degrees, 55 degrees, 65 degrees, or a range of from 25 degrees to 65 degrees.

9. The valve of claim 4, comprising:
a manual opening mechanism including a valve stem and configured for manually moving the piston to permit or impede the fluid flow from the inlet port to the outlet port, wherein at least a portion of the manual opening mechanism extends through an opening in the port plate that is in axial alignment with the piston.

10. The valve of claim 4, wherein the cartridge comprises:
a cartridge body forming a housing and having a seat;
an elongated stem having a radially enlarged head portion for sealing against a seat; and
the piston extending radially outward from the stem at an end of the stem opposite the radially enlarged head portion;
wherein the cartridge body includes a shelf between the radially enlarged head portion and the piston, the shelf portion having a relief hole for fluid flow into and out of a chamber formed by a surface of the piston and an upper surface of the shelf.

11. The valve of claim 4, wherein the cartridge includes
a cartridge body forming a piston chamber and a valve seat;
a valve member for sealing against the valve seat; and
the piston movable in the cylinder, wherein the piston is movable axially in the piston chamber and connected coaxially to the valve member for moving the valve member;
wherein the cartridge body includes a shelf interposed between the valve member and the piston so as to block the flow of fluid passing through the valve seat from directly impinging on the piston, and at least one relief flow passage fluidly connecting fluid pressure from a valve seat side of the shelf to a piston side of the shelf.

12. The valve of claim 11, wherein the valve member is connected to the piston by a valve stem extending through an opening in the shelf.

13. The valve of claim 11, wherein a spring is interposed between the piston and shelf for biasing the valve member against the valve seat.

14. The valve of claim 11, wherein the cartridge body has a shoulder for engaging a corresponding shoulder of a valve body for axially positioning the cartridge in the valve body, and the cartridge further has a nose portion having a width less than the width of the shoulder and forming at its distal end the valve seat.

15. The valve of claim 11, wherein the relief flow passage opens to a reduced diameter side wall of the cartridge.

16. The valve of claim 1, wherein the axial alignment of the manual opening mechanism and the piston includes each of the manual opening mechanism and piston having central longitudinal axes extending therethrough being collinear.

17. The valve of claim 1, wherein the cavity includes a cylindania-shaped portion disposed between the inlet port and the inlet pressure passageway to direct contaminant away from the inlet pressure passageway, the cylindania-shaped portion having a central longitudinal axis aligned parallel to a central longitudinal axis of the inlet port.

18. The valve of claim 1, wherein the inlet pressure passageway provides fluid communication between the inlet port and the port plate, and wherein the outlet pressure passageway provides fluid communication between the outlet port and the port plate.

* * * * *